No. 796,916. PATENTED AUG. 8, 1905.
E. LELONG.
CHAIN MAKING MACHINE.
APPLICATION FILED FEB. 3, 1904.

WITNESSES
F. W. Wright
Walter Abbr

INVENTOR
Emile Lelong
BY
Howson and Howson
ATTORNEYS

No. 796,916. PATENTED AUG. 8, 1905.
E. LELONG.
CHAIN MAKING MACHINE.
APPLICATION FILED FEB. 3, 1904

WITNESSES
G. W. Wright
Walter Abbe

INVENTOR
Emile Lelong
BY
Howson and Howson
ATTORNEYS

Fig. 12

No. 796,916. PATENTED AUG. 8, 1905.
E. LELONG.
CHAIN MAKING MACHINE.
APPLICATION FILED FEB. 3, 1904.

WITNESSES
F. W. Wright
Walter Abbr

INVENTOR
Emile Lelong
BY
Howson and Howson
ATTORNEYS

No. 796,916. PATENTED AUG. 8, 1905.
E. LELONG.
CHAIN MAKING MACHINE.
APPLICATION FILED FEB. 3, 1904.

WITNESSES
F.W. Wright
Walter Abbe

INVENTOR
Emile Lelong
BY
Howson and Howson
ATTORNEYS

No. 796,916. PATENTED AUG. 8, 1905.
E. LELONG.
CHAIN MAKING MACHINE.
APPLICATION FILED FEB. 3, 1904.

WITNESSES
F. W. Wright
Waller Abbs

INVENTOR
Emile Lelong
BY
Howson and Howson
ATTORNEYS

UNITED STATES PATENT OFFICE.

EMILE LELONG, OF COUILLET, BELGIUM.

CHAIN-MAKING MACHINE.

No. 796,916.

Specification of Letters Patent.

Patented Aug. 8, 1905.

Application filed February 3, 1904. Serial No. 191,844.

*To all whom it may concern:*

Be it known that I, EMILE LELONG, a subject of the King of the Belgians, residing at Couillet, Belgium, have invented an Improved Chain-Making Machine, of which the following is a specification.

The object of this invention is to provide an improved machine for forming a chain-link to enable it to be formed from a bar of metal upon an anvil and hammered, welded, and formed into the proper cross-section without removal from the anvil; and the invention further resides in the specific elements of construction, arrangement, and combination of parts, as hereinafter pointed out in the description and claims.

In the accompanying drawings.

In order that my invention may be readily understood, I will first describe the method which I preferably adopt in using this invention; but I do not abandon my right to claims for such method, as I intend to apply for a patent thereon as a division of this application. Briefly stated, this method consists in taking a bar 8, of iron or the like, of suitable cross-section, preferably square and having scarfed ends, (see Figs. 1 to 6,) heating it to a welding heat, feeding it onto a stationary supporting plate or anvil, at the same time forming it into a volute ring thereon, removing all manipulating means from the ring without disturbing its position on said anvil or plate, welding together the convolutions of the ring when in such position, forging the rectangular or other cross-section of the ring thus formed into a circular or other desired cross-section, and then forming the ring into the oval form of an ordinary chain-link.

The machine of this invention consists of three principal parts: the pedestal 1, carrying the operating-gear for those forming-rolls which are at all times in operative position, the anvil 45, on which the link is formed and forged, and the cover part 92, carrying additional forming-rolls, which are in operative position only during the forming operation and are adapted to be moved out of the way during the welding and forging of the link. The additional forming-rolls of the cover part are preferably mounted so as to rotate on shafts in fixed bearings; but the forming-rolls of the pedestal, which also do duty during forging, are movable radially from a common axis or center, and a counterweight is provided to always hold them with substantial pressure against the ring in process of formation.

The pedestal 1 is provided with a frame 2, which carries a pillow-block 3 for the main shaft 69, fly-wheel 71, fast and loose pulleys 72 73, spur-gear 74 for driving the forming-rolls in the cover part, as hereinafter described, and the bevel-gear 75, located within the pedestal. A bushing 70 in the side of the pedestal serves as a second bearing for the shaft 69. An inwardly-turned flange 5 within the pedestal serves to support a circular plate 6, which is secured to it by bolts 7. This plate 6 has three rotatable bushings 23, 24, and 25, and vertically in line with said bushings are footstep-bearings 17, 18, and 19 in the base of the pedestal for the stub ends 11, 12, and 13 of vertical tubular shafts 8, 9, and 10, the upper ends of which are threaded into the bushings 23, 24, and 25. Near the bottom of each tubular shaft 8, 9, and 10 a socket is formed, into which a ball end 29, 30, and 31 of vertical shafts 26, 27, and 28, respectively, are pinned by bolts 32, 33, and 34, forming universal joints for the shafts 26, 27, and 28. The stub ends of the tubular shafts are capped with bearing-pieces 14, 15, and 16 and provided with bushings 20, 21, and 22, set in the base of the pedestal.

Figure 8:
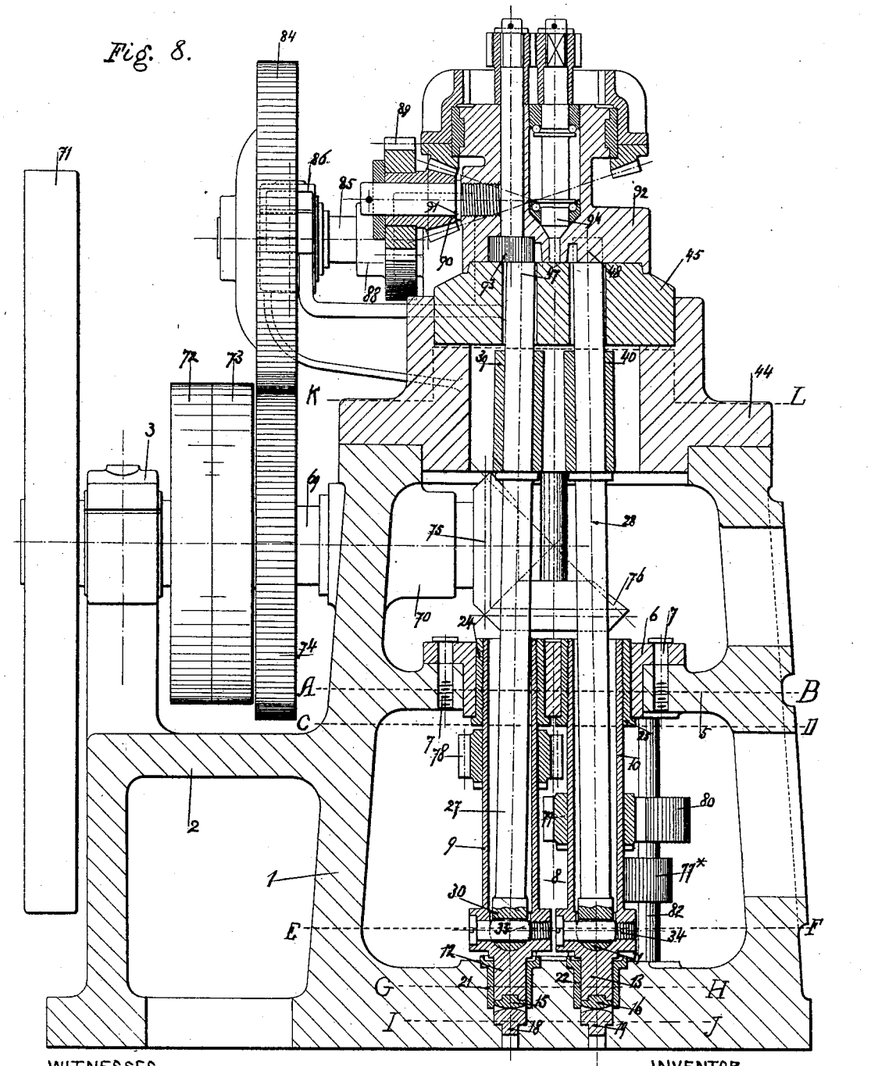
Fig. 8 is a transverse sectional view on the line 8 8, Fig. 10.
Figure 9:
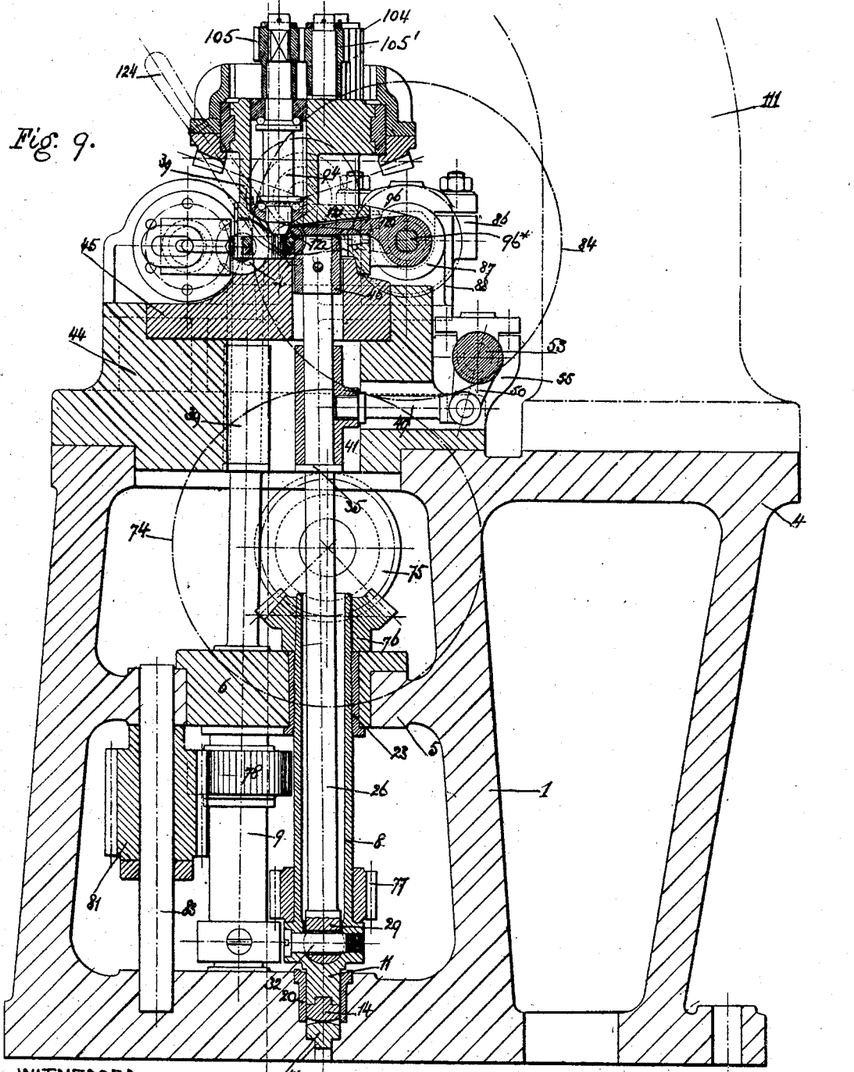
Fig. 9 is a transverse sectional view on the line 9 9, Fig. 10.
Figure 13:
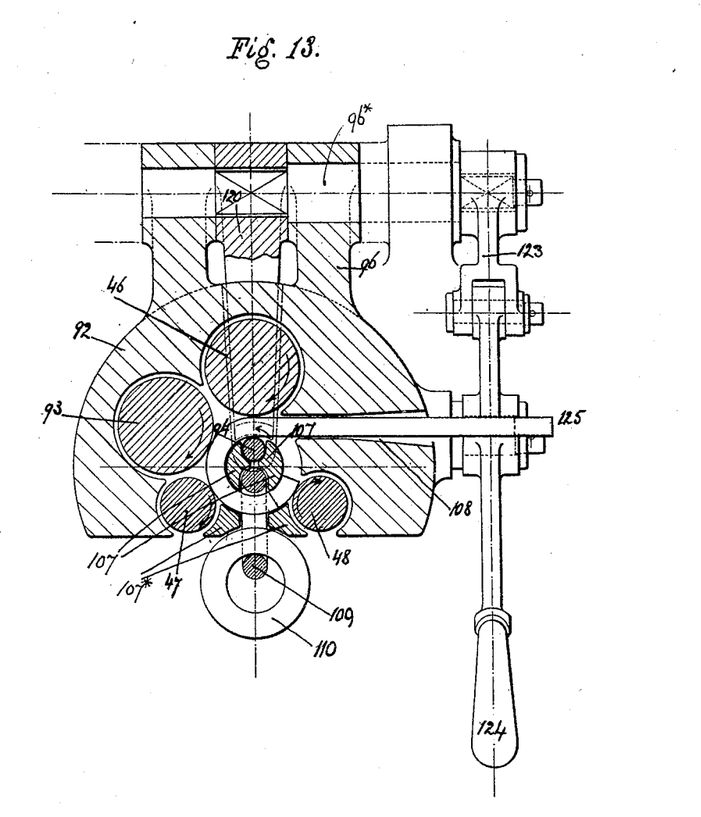
Fig. 13 is a horizontal sectional view on line 13 13, Fig. 12.

Two auxiliary shafts 82 and 83 are provided with bearings in the flange 5 and in the base of the pedestal. The forming-roll shafts must all turn in the same direction. Therefore I gear them together in the following manner: I make the tubular shaft 8 so long as to project above the plate 6 and secure a bevel-pinion 76 to it, which pinion 76 is in mesh with the bevel-gear 75, thus providing a means for rotating the tubular shaft 8 and a spur-pinion 77 thereon. This pinion 77 is in mesh with a spur-pinion 77* on the auxiliary shaft 82, which auxiliary shaft transmits its motion by a spur-pinion 80 to a spur-pinion 79 on the tubular shaft 10. The spur-pinion 79 meshes with the pinion 81 on the shaft 83, and this pinion 81 in turn gears with spur-pinion 78 of the tubular shaft 9. It will be obvious that the shafts 26, 27, and 28 are positively rotatable with their tubular driving-shafts; but at the same time each is free to swing on its end as a universal pivot-point. The object of this construction is to allow the forming-rolls 46, 47, and 48 (see Figs. 8, 9, and 13) to be mounted so that they may be forced toward a common center to frictionally grasp the link under process of manufacture and to give way during the forging operation, as hereinafter described.

Figure 10:
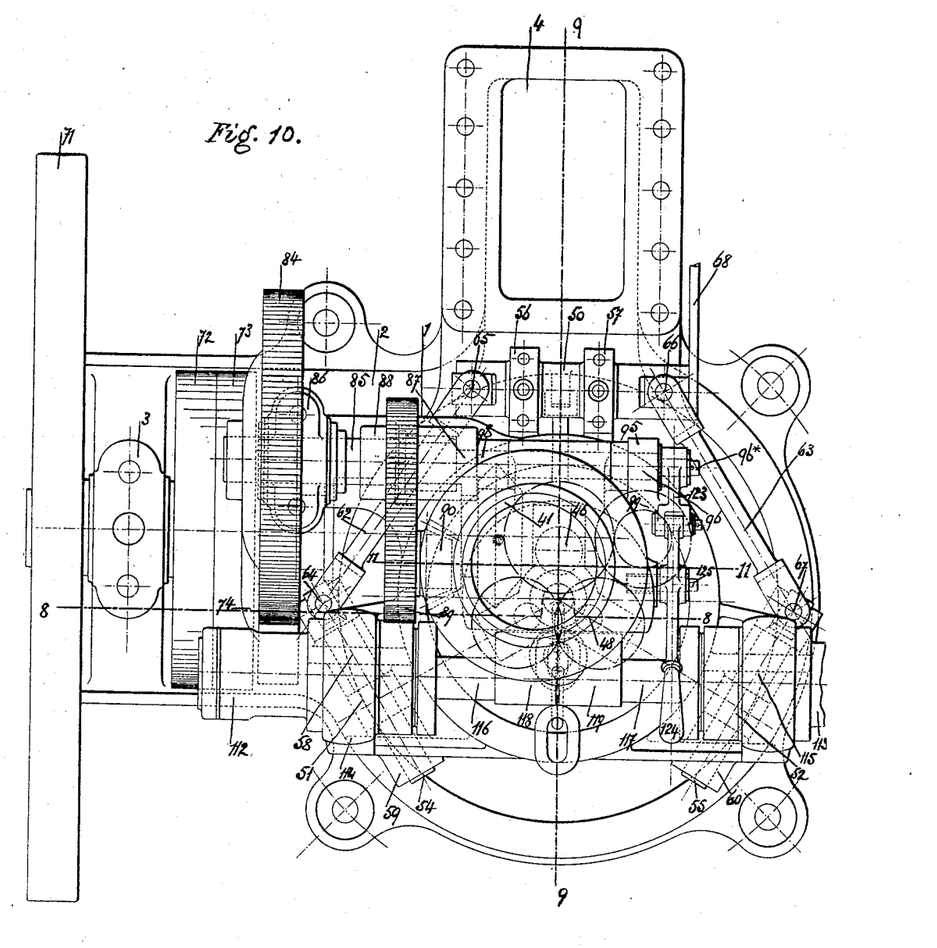
Fig. 10 is a top plan of the machine with the hammer removed, certain gearing within the top of the cover part being removed for simplicity.
Figures 21, 22:
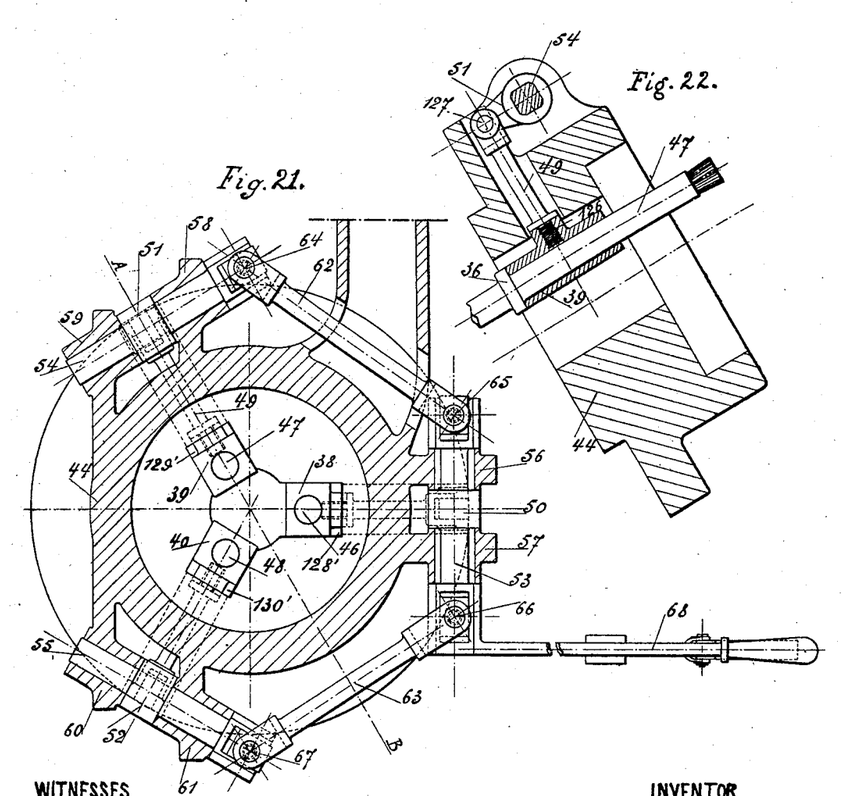
Fig. 21 is a cross-sectional view on the line K L, Fig. 8.
Fig. 22 is a cross-sectional view on the line A' B', Fig. 21.
Figure 23:
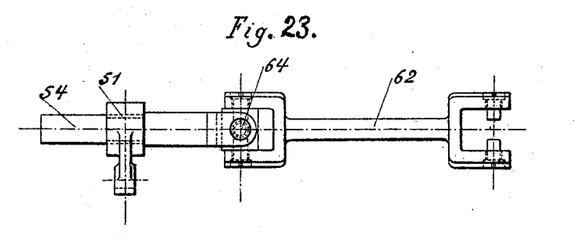
Fig. 23 is a detail in elevation of the connecting-rod 62 and its connections.

The anvil is formed of two parts—the anvil proper, 45, and a supporting-collar 44, mounted on the pedestal. The collar 44 has a central opening through which the vertical forming-roll shafts pass. Radial apertures through the collar connect this central opening with the outside and serve for the passage of rods 49, (see Fig. 9,) each connected at one end with one of the bushings 39, 40, and 41 on one of the forming-roll shafts. The rods are connected at their other ends as follows, (see Figs. 10 and 7:) bushing 41 and rod 49 to a depending crank 50, secured to shaft 53, mounted in brackets 56 57 on the supporting-collar 44, while bushings 39 and 40 are connected with cranks 51 and 52, (shown in dotted lines in Fig. 10,) secured to shafts 54 and 55, mounted, respectively, in brackets 58 59 and 60 61. Upwardly-extending studs 66 67, between shafts 53 55, are connected by a rod 63, while studs 64 65 and connecting-rod 62 connect shafts 53 and 54. A weighted lever 68, fast on shaft 53, always tends to rock these shafts to force the rods 49 inward to force the bushings 39, 40, and 41 in toward their common center. The action of the weighted lever 68 upon the forming-roll shafts 46, 47, and 48 can be readily understood on reference to Figs. 21 to 23, inclusive. The lever 68 is fast on the shaft 53, to each end of which bifurcated rods 62 63 are fastened, so as to partake as levers of the rotary motion of the shaft 53. These levers are similarly secured to the shafts 54 55 and serve to rotate them in correspondence with shaft 53. Short lever-arms 51 52 (see Figs. 21 and 22) are in turn swung by the aforesaid rotation of the shafts 54, so as to throw a connecting-rod 49 inward or outward. This rod 49 is threaded at 126 into the bushing 39 of the shaft 47.

Figure 11:
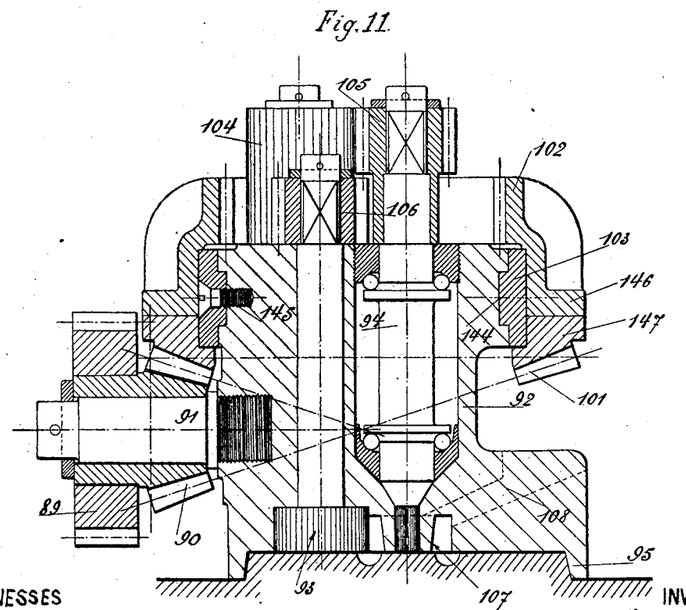
Fig. 11 is a sectional view of the cover part on line 11 11, Fig. 14.
Figure 16:
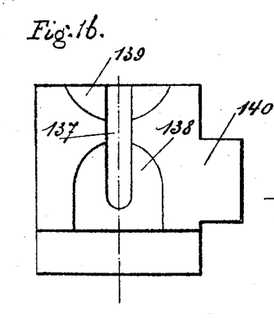
Figs. 16 and 16$^a$ are a side elevation of the face of the pressure-blocks and a horizontal cross-section of the blocks, respectively.
Figure 16A:
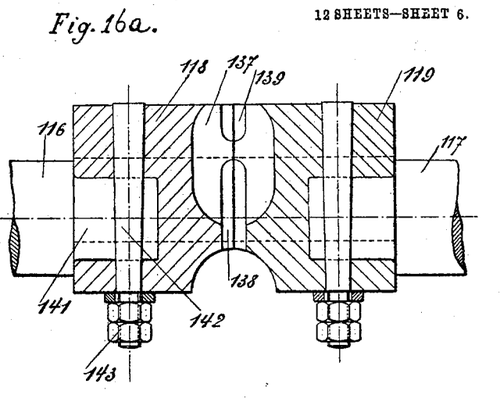
Figure 17:
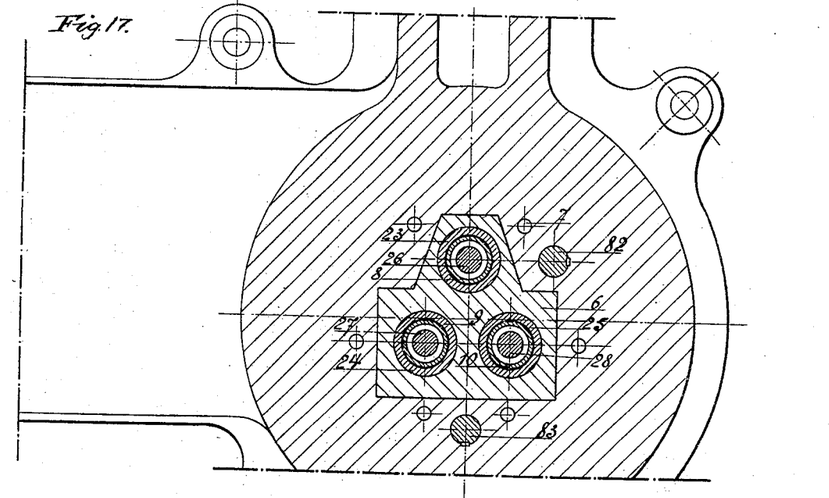
Fig. 17 is a cross-sectional view on the line A B, Fig. 8.
Figure 18:
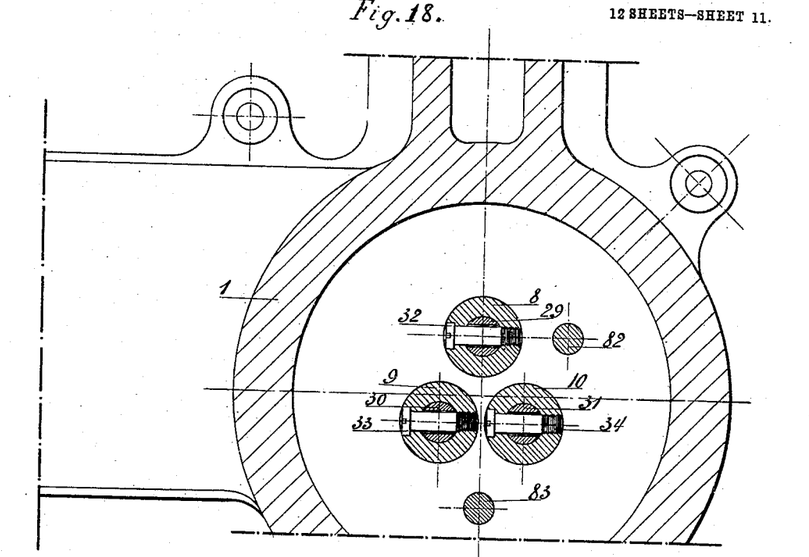
Fig. 18 is a cross-sectional view on the line E F, Fig. 8.
Figure 19:
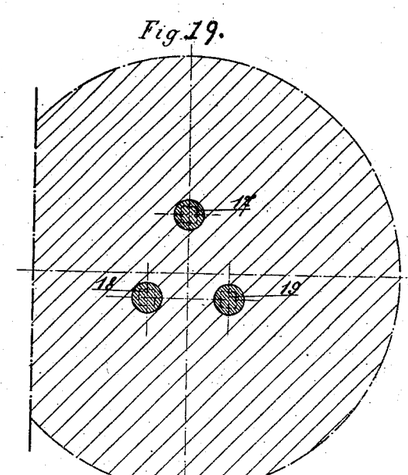
Fig. 19 is a cross-sectional view on the line I J, Fig. 8.
Figure 20:
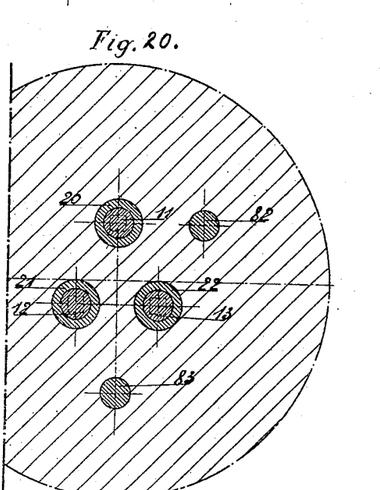
Fig. 20 is a cross-sectional view on the line G H, Fig. 8.

The anvil proper, 45, is radially slotted to allow the movement of the forming-rolls toward and away from a common center and is circularly recessed, as at $x$, Figs. 11 and 12, immediately beneath the position occupied by the ring formed by the rolls, while a vertical recess $y$ is formed to so accommodate a forged link as to cause one side of such link to pass up within the circular recess $x$ for the purpose hereinafter described. In front of said anvil 45 are two pressure-blocks 118 and 119, Fig. 10, with faces shaped to conform with the oval of an ordinary link and also to accommodate two interchained links on its opposite sides. These pressure-blocks 118 and 119 are mounted on shafts 116 117 of hydraulic rams 112 and 113, mounted in brackets 114 and 115 on the collar 44. The pressure-blocks 118 119 may be secured on their shafts 116 117 by cotter-pins 142 and nuts 143, as shown in Figs. 16 and 16ª. They may have a squared projection 140 on their under sides, on which they may slide on the body of the machine and be provided with two oval-shaped recesses 138 and 139, connected by a deeper channel 137.

Figure 7:
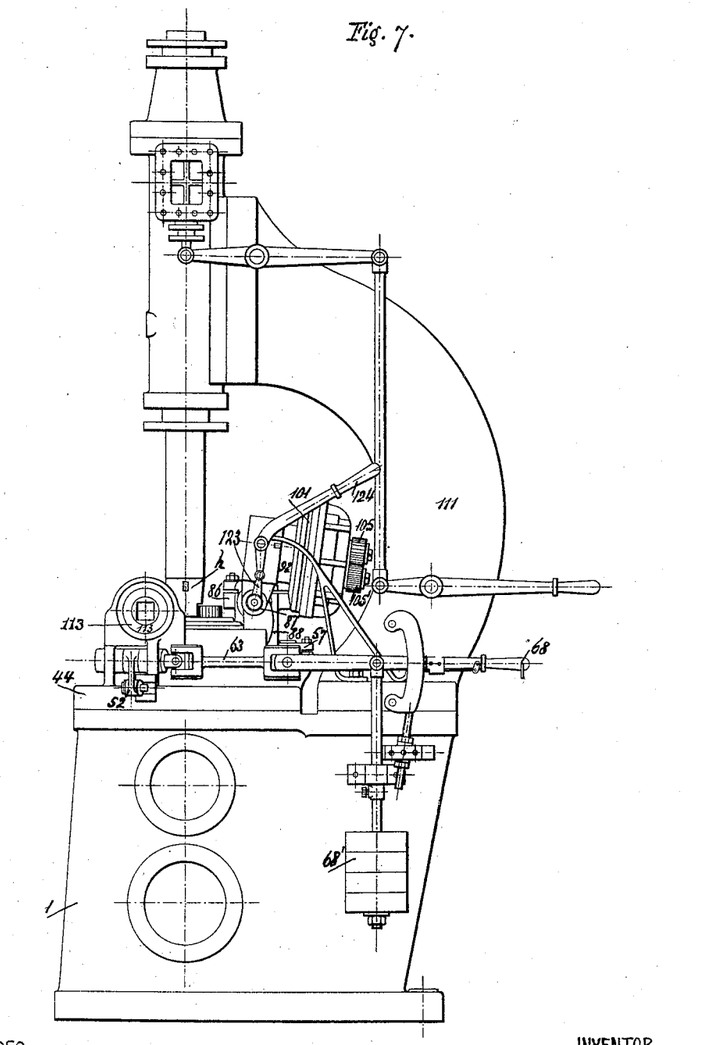
Fig. 7 is a side elevation of a machine embodying my invention with the parts in the positions they occupy after the ring of Fig. 6 has been formed and is ready to be welded and forged.

An extension 4 of the pedestal, Fig. 7, has a bracket 111 secured to it, carrying a circularly-recessed hammer $h$ with its circular recess vertically over the circular recess $x$ in the anvil.

On the collar 44 there is a side bracket carrying a pillow-block 86, in which the shaft 85 of the spur-gear 84 is mounted. This gear 84 meshes with the spur-gear 74 on the main shaft 69. On the inner end of the shaft 85 is a spur-gear 88. At the rear of the collar 44 the brackets 95 98 hold a shaft 96*. The cover part 92 is mounted by means of arms 96, so as to freely pivot on this shaft 96*. The cover part 92 carries on its lower face two forming-rolls 93 94 and four downwardly-depending stationary lugs 107 107, being one on each side of the roll 94 and a pair 107*

Figure 14:
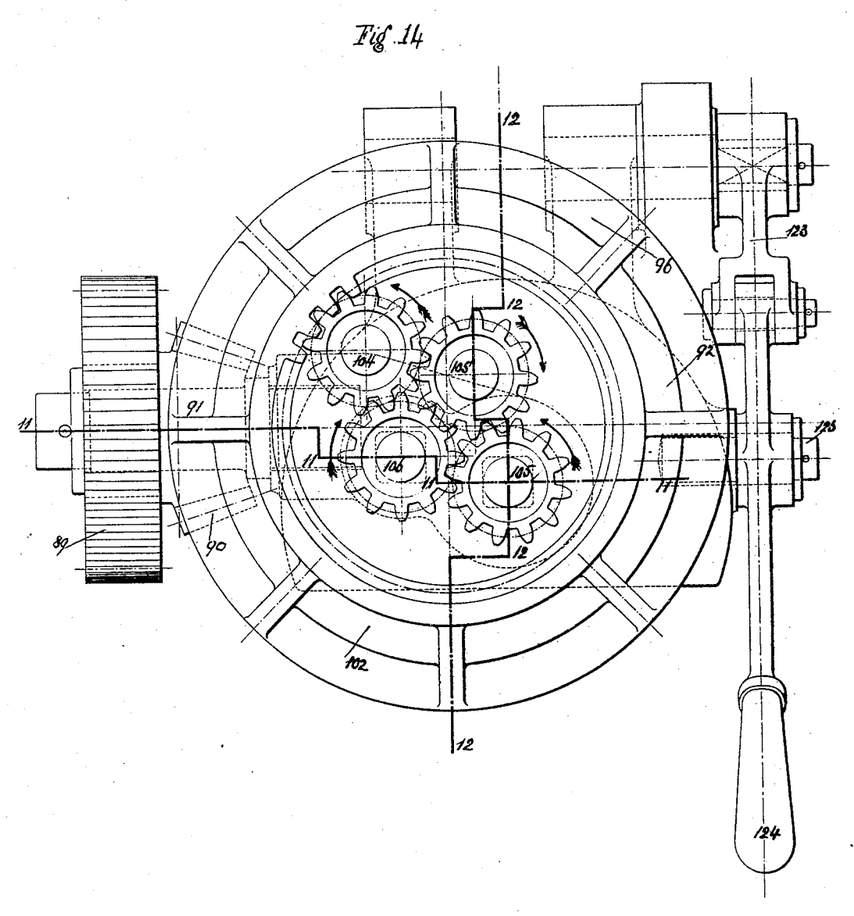
Fig. 14 is a top plan of the cover part, showing the gearing omitted from Fig. 10.
Figure 15:
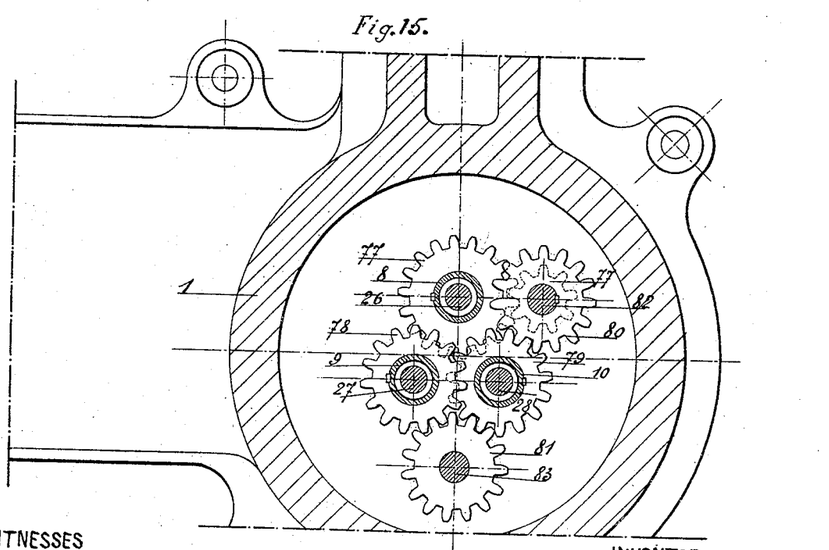
Fig. 15 is a cross-section of Fig. 8.

107* at the front of the cover part. Through an aperture 121 through the rear of the cover part there projects over the top of the forming-roll 46 a detaining-arm 120, provided with a turned-down end 122, adapted to rest, if depressed, upon the link 100 in course of formation. This arm 120 is keyed upon the shaft 96* and is capable of a limited motion with relation to the cover part within the aperture 121. A stud 125 at the side of the cover part has mounted upon it a hand-lever 124, connected at one end by a crank 123 with the shaft 96*. Immediately above this stud 125 a feed-channel 108 is formed through the cover part for the passage of the metal rod, which is to form a link, said rod being grasped by and between the rolls 46 and 94, which to this extent perform the function of feeding-rolls. The forming-rolls 93 94 on the under face of the cover part 92 receive their motion from a train of gearing as follows: A stud 91, secured in the cover part, carries a spur-gear 89 and a bevel-gear 90, turning together. The spur-gear 89 meshes with the gear 88 on the counter-shaft 85 when the machine is in the position of Figs. 8, 9, and 10, and as the cover part is hinged axially with the gear 88 it remains in mesh even when in the lifted position of Fig. 7. The upper periphery of the cover part is provided with a bearing-ring 103, on which a crown-wheel 101 turns, being driven by the bevel-gear 90. The bearing-ring 103 is secured on the periphery of the cover part 92 by a circular horizontal tongue-and-groove construction which holds it against vertical displacement, and the crown-wheel 101 is formed in two parts, so as to be readily fitted, one from the top and the other from the bottom, against said ring, so as to bear against and be vertically supported by said ring, on which it turns, and the two parts being secured together by any suitable means, so as to turn together as an integral member. This crown-wheel in its upper part above the cover part has an internal gear 102, which meshes with a double-width gear 104, mounted on a stud in the cover part, Figs. 12 and 14, which operates in turn both gears 105' 106. Gear 105' meshes with the upper half of the double-width gear 104 and also with gear 105 on the shaft of the forming-roll 94, the gears and shafts turning in the directions of the arrows, Fig. 14. A gear 106 on the shaft of the forming-roll 93 occupies a position beneath the teeth of the gears 105 and 105', and it turns its shaft in the opposite direction to shaft 94, receiving motion from the gear 104, with the lower half of which it meshes.

Figure 1:
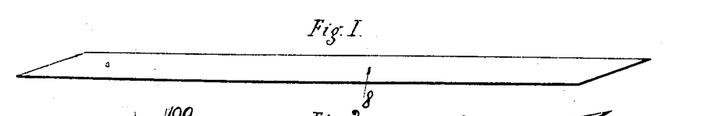
Figure 1 is a side view of the special bar which is to form a link before it has been operated upon.
Figures 2, 3:
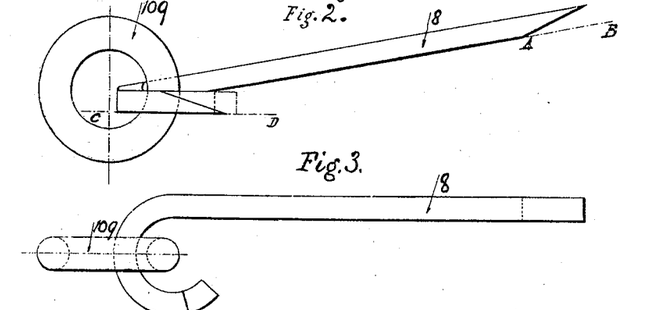
Fig. 2 is a side view of the bar immediately after entering a previously-formed link.
Fig. 3 is a plan of Fig. 2.
Figure 4:
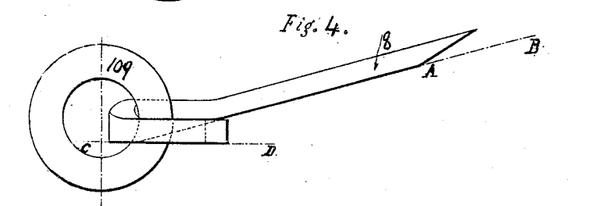
Fig. 4 is a side view of the bar immediately after so much of it has encircled the formed link as to form a single spire of a volute ring.
Figure 5:
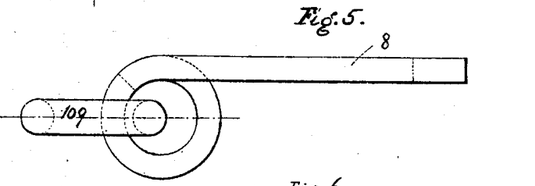
Fig. 5 is a plan of Fig. 4.
Figure 6:
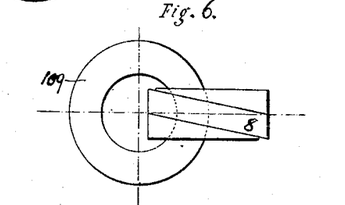
Fig. 6 is a side view of the entire bar formed into a volute ring and linked within a previously-formed link.

I will now describe the operation of the machine hereinabove described. Consider the parts of the machine to be in the positions shown in Figs. 8, 9, 10, and 11, with the formed rings 110 and 109 in positions shown in Figs. 12 and 13. I take the bar 8 of Fig. 1 and pass it through the feed-channel 108 on the angle of line A B, Fig. 2, so that it is gripped between the rolls 46 and 94 and fed to the rotating forming-rolls 46, 93, 47, and 48 and lugs 107* 107* on what is to be the outside periphery of the ring and forming-roll 94 and lugs 107 107 on what is to be the inside of the ring. The ring 109 fits in the recess $y$ against the lugs 107 107 and between the lugs 107* 107*, and the rotating forming-rolls circularly form and advance the end of the bar 8 into the position shown in Figs. 2 and 3, the scarfed end of the bar fitting snugly under the advancing-bar, as shown in Figs. 4 and 5. The rolls continue the circular advancement of the ring now formed, adding additional superposed convolutions to the volute ring until the ring 100 occupies the position shown in Figs. 6 and 12, entirely inclosed upon itself and enchained within the ring 109. The hand-lever 124 is now lifted, depressing the crank 123 and forcing the detaining-arm 120 firmly down upon the ring 100 just formed. (See Fig. 12.) Upon the continued lifting of the handle 124 the rolls 93 94 and lugs 107 107 and 107* 107* are lifted clear of the ring 100 without the possibility of even accidentally lifting the ring from the anvil 45 by the friction of the cover parts, because the ring is held down by the arm 120. When the cover part has been moved so as to free it from the link on the anvil, the lower surface of the aperture 121 will bear upon the under side of the detaining-arm 120, which is thereby lifted as the cover part rises farther from the anvil and into the position shown in Fig. 7. When in that position, Fig. 7, the volute ring will be seen to be free of all connection with the cover part and in position over the circular recess $x$ in the anvil-face and closely gripped between the three forming-rolls 46, 48, and 47. It is now that the hammer $h$ drops and welds the ring of rectangular cross-section into a homogeneous ring and forges it into a cross-section, such as shown in ring 109, by reason of the circular recesses of anvil and hammer faces. It is evident that the rolls 46, 47, and 48 because of their universal-joint mountings and because of the weighted lever 68, hereinbefore described, which tends to force them toward a common center, are free to be forced outwardly as the ring is increased in diameter by the repeated blows of the hammer $h$. When it is desired to forge the ring into a circular cross-section, the operator may raise the handle of the weighted lever, and thus remove the forming-rolls from direct contact with the ring being formed and to one side of the path of travel of the hammer. The hammer is then allowed to fall on the ring to forge it, and as the operator desires he may rotate the ring to present different portions of the hammer and anvil to the ring by again throwing in the rolls to rotate the ring intermittently at any time during the forging operation.

Figure 12:
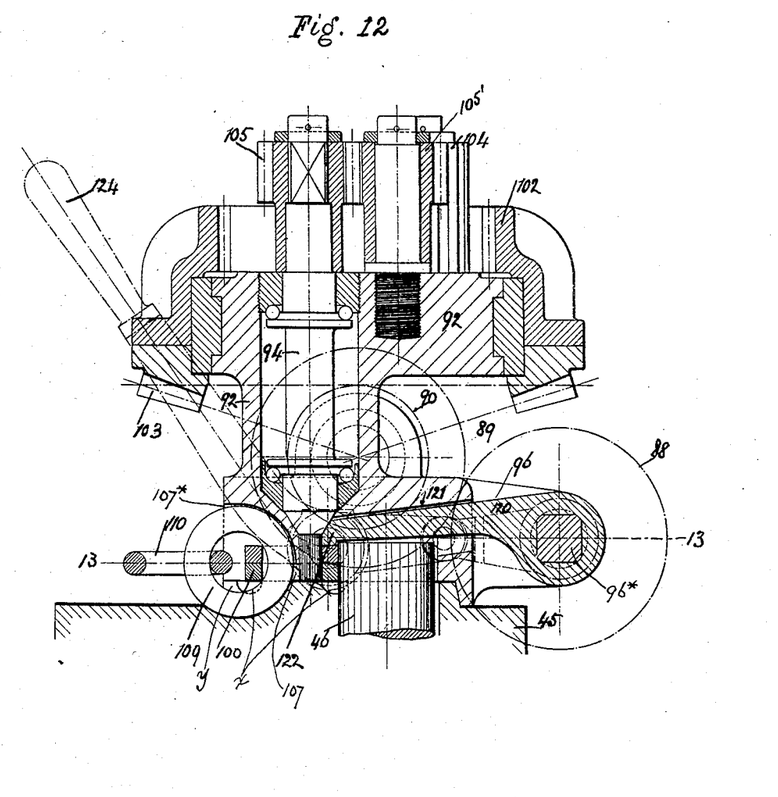
Fig. 12 is a view of the cover part on line 12 12, Fig. 14.

At any time before the previously-formed ring cools and loses its ductile condition, preferably before or during the forming of a following ring, the hydraulic rams 112 113 are caused to project the pressure-blocks 118 119 against the circular link 110, Fig. 12, to bend it into the usual oval form. When the link 100 is properly forged, the entire chain is given a quarter-turn to bring the newly-forged link out from the rolls and into position in the recess $y$. The oval link has in the meantime been freed from the hydraulic pressure-blocks, and the link between the oval link and the link last formed is thus brought into position to be operated upon by the hydraulic blocks. The cover part is now let down, the lugs 107 107 107* 107* straddling the ring last formed and a new heated bar 8 fed in, as before described, and the process repeated.

I claim as my invention—

1. An improved apparatus for forming a chain-link, from a bar, comprising a stationary supporting-plate, on the face of which the link, when formed, is supported, and forming means having forming-surfaces substantially perpendicular to said plate, and located substantially as described, and means for feeding a blank to said forming means in such direction that it will be shaped into a helical ring by them and laid upon the supporting-plate while still under the influence of the forming means.

2. An improved apparatus for forming a chain-link from a bar, comprising a stationary anvil, on the face of which the link when formed is adapted to be supported, forming-rolls having forming-surfaces substantially perpendicular to said anvil, a hammer above the rolls there being an unobstructed passage from above the rolls permitting the hammer to enter between the rolls to act on the links.

3. An improved apparatus for forming a chain-link from a bar, comprising an anvil, on the face of which the link, when formed, is adapted to be supported, a plurality of forming means located around a common axis, and adjacent to the face of the anvil and a hammer arranged to travel substantially in line with said axis and between the forming means.

4. An improved apparatus for forming a chain-link from a bar, comprising an anvil on the face of which the link, when formed, is adapted to be supported, a plurality of forming means located around a common axis, and adjacent to the face of the anvil and a hammer arranged to travel substantially in line with said axis and between the forming means, in combination with means for yieldingly holding said forming means toward their common axis.

5. An improved apparatus for forming a chain-link, comprising an anvil, on the face of which the link, when formed, is adapted to be supported, a plurality of forming means located around a common axis, means for removing some of said forming means after the formation of a link and a hammer substantially in line with said common axis and arranged to pass between and free of said forming means.

6. An improved apparatus for forming a chain-link from a bar, comprising an anvil, a plurality of forming means located around a common axis, means for removing some of said forming means after the formation of a link and a hammer substantially in line with said common axis, and means for yieldingly holding toward said common axis said forming means which are not so removed.

7. An improved apparatus for forming a chain-link, comprising a stationary supporting-plate, on the face of which the link, when formed, is adapted to be supported, a plurality of forming means, located without and within a circle on the plate, and means for yieldingly holding toward a common axis, some of said forming means.

8. An improved apparatus for forming a chain-link, comprising a stationary supporting-plate, a plurality of forming means located without and within a circle on the plate, means for yieldingly holding toward a common axis some of said forming means, and means adapted to remove other of said forming means after the formation of a link.

9. An improved apparatus for forming chain-links, comprising a stationary supporting-plate, a plurality of forming means located without and within a circle on the plate, means for yieldingly holding toward a common axis some of said forming means, and means adapted to remove the forming means within the circle after the formation.

10. An improved apparatus for forming chain-links, comprising a stationary supporting-plate, a plurality of forming rolls and lugs located without and within a circle on the plate, and means for yieldingly holding toward a common axis some of said rolls.

11. An apparatus for forming chain-links, comprising a stationary supporting-plate, on the face of which the link, when formed, is adapted to be supported, means for feeding a bar to said plate, means for forming said bar into a helical ring on the plate, and means for removing said forming means from the ring so as to leave it freely supported on said plate.

12. An apparatus for forming chain-links, comprising an anvil, on the face of which the link, when formed, is adapted to be supported, a cover part carrying forming means, and forming-rolls adjacent to said anvil, a hammer above said rolls and means for moving the cover part out of the path of said hammer, said forming-rolls being yieldingly mounted.

13. An apparatus for forming chain-links, comprising an anvil, a hammer above it, a removable cover part carrying forming means, additional forming-rolls, said forming means and rolls being so disposed as to form a circle on said anvil, the means on said cover part comprising lugs and rolls.

14. An apparatus for forming chain-links, comprising an anvil, a hammer above it, a removable cover part carrying forming means, additional forming-rolls, said forming means and rolls being so disposed as to substantially form a circle on said anvil, the means on said cover part comprising lugs and rolls, said additional forming-rolls being yieldingly mounted and movable toward their common axis.

15. An apparatus for forming chain-links from a solid bar, comprising an anvil, on the face of which the link, when formed, is adapted to be supported, a group of forming-rolls perpendicular to said anvil's face, a hammer above said rolls and pressure-blocks at one side of said anvil located on a line from the center of said group of rolls and passing between a pair of them.

16. Apparatus for forming chain-links, comprising an anvil, on the face of which the link, when formed, is adapted to be supported, forming-rolls projecting above the surface of the anvil, a removable cover part having a feed-channel, and forming means carried by said cover part and a hammer above said cover part.

17. Apparatus for forming chain-links, comprising an anvil, on the face of which the link, when formed, is adapted to be supported, forming-rolls yieldingly mounted with their surfaces substantially perpendicular to the anvil, and means for passing a link of a chain in process of manufacture within the action of the forming-rolls, and pressure-blocks located in front of the center of the group of rolls and in a line between the rolls, and adapted to act upon a link of the said chain while part of the chain is still between the rolls.

18. Apparatus for forming chain-links, comprising an anvil, on the surface of which the link, when formed, is adapted to be supported, forming-rolls yieldingly mounted with their surfaces perpendicular to the anvil, a pivoted cover part carrying forming means and provided with a feed-channel, and means for passing a link of a chain in process of manufacture within the action of the forming-rolls and pressure-blocks having their surfaces located in front of the center of the group of rolls, and in a line between two rolls, and adapted to act upon a link.

19. Apparatus for forming chain-links, comprising a stationary supporting-plate, on the face of which the link, when formed, is supported, a number of circularly-arranged forming-rolls, and a centrally-located forming-roll, adjacent to said face and so located as to act upon the periphery of the formed link while the same is supported on said plate, in combination with means for feeding a blank to said forming means in such direction that it will be formed into a helical ring by them and laid upon the supporting-plate while under the influence of the forming means.

20. Apparatus for forming chain-links, comprising a stationary supporting-plate, on the face of which the link, when formed, is supported, a number of circularly-arranged forming-rolls, and a centrally-located removable forming-roll adjacent to said face and so located as to act upon the periphery of the formed link while the same is supported on said plate, in combination with means for feeding a blank to said forming means in such direction that it will be formed into a helical ring by them and laid upon the supporting-plate while under the influence of the forming means.

21. Apparatus for the manufacture of chain-links from a bar, comprising a stationary supporting-plate, on the face of which the link, when formed, is adapted to be supported, means for holding a previously-formed link, means for feeding a bar onto said plate and into said link, means adjacent to the anvil for forming said bar into a helical ring during its feed through the link, and means for releasing said forming means from the ring without removing the ring from the plate.

22. Apparatus for the manufacture of chain-links from a bar, comprising an anvil, on the face of which the link, when formed, is adapted to be supported, forming and feeding means for coiling the bar into a ring of more than one convolution, and for feeding the successive convolutions of said ring through a previously-formed ring during its formation, in combination with means for forging the ring thus formed into the desired cross-section, and an unobstructed passage for said means between itself and the said ring upon said anvil.

23. Apparatus for the manufacture of chain-links from a bar, comprising an anvil, on the face of which the link, when formed, is adapted to be supported, forming and feeding means for coiling the bar into a ring of more than one convolution upon the anvil, and for feeding the successive convolutions of said ring through a previously-formed ring during its formation, in combination with means arranged to pass between the forming means for forging the ring thus formed into the desired cross-section, and pressure means having surfaces adjacent to said anvil and in the line taken by the chain as it passes from the center of the group of rolls between two of the rolls adapted to bend a previously-formed ring of the chain thus produced into an oval link.

24. An apparatus for the manufacture of chain-links, comprising an anvil, forming and feeding means for feeding and forming a bar, arranged circularly on said anvil, means for admitting a previously-formed link onto said anvil within the circle of forming means, said feeding means being adapted to feed said ring through the one previously formed and during its shaping by the forming means, and a hammer arranged to pass between and within the circle of forming means.

25. An apparatus for the manufacture of chain-links, comprising an anvil having a circularly-recessed face, forming means surrounding the recess, said anvil being provided with a recess crossing said circular recess, and means for feeding a bar to the forming means, and a hammer arranged to pass between the forming means for forging the formed ring to the configuration of the circular recess.

26. An apparatus for the manufacture of chain-links, comprising an anvil, on the face of which the link, when formed, is adapted to be supported, rotating forming-rolls, movably mounted so as to be able to recede or approach the link being formed, and a hammer arranged to pass between the forming-rolls for welding the ring on the anvil between the forming-rolls.

27. An apparatus for making chain-links, comprising a stationary supporting-plate, on the face of which the link, when formed, is supported, two sets of forming-rolls therefor, one set interior and removably mounted adapted to be withdrawn after the ring is formed, and means permitting the other set to be moved away outwardly from the ring, said forming-rolls being adjacent to said face and so located as to act upon the periphery of the formed link while the same is supported on said plate.

28. An apparatus for making chain-links, comprising a stationary supporting-plate, on the face of which the link, when formed, is adapted to be supported, two sets of forming-rolls therefor, one set interior and removably mounted adapted to be withdrawn after the ring is formed, and means for permitting the other set to be removed outwardly upon the enlargement of the ring, in combination with a detaining-arm for holding the ring to the anvil during the withdrawal of one set of rolls.

29. An apparatus for making chain-links, comprising a stationary supporting-plate, on the face of which the link, when formed, is adapted to be supported, two sets of forming-rolls, one set interior and removably mounted adapted to be withdrawn after the ring is formed, and means for permitting the other set to be moved outwardly upon the enlargement of the ring, in combination with a detaining-finger, and means for temporarily causing it to bear on the ring formed.

30. An apparatus for making chains, comprising a stationary supporting-plate, on the face of which the ring, when formed, is adapted to be supported, forming-rolls movable toward and away from the common center, and means for holding them toward such center, a cover part and forming-rolls thereon, a detaining-arm on the cover, and means for lifting the cover and, at the same time, depressing said detaining-arm, and means upon the continued lifting of the cover for lifting said detaining-arm.

31. An apparatus for forming chain-links, comprising a stationary supporting-plate, on the face of which the link, when formed, is adapted to be supported, forming-rolls, shafts therefor, tubular shafts surrounding aforesaid shafts, gearing for rotating them, a ball-and-socket joint between the ends of the shafts of the forming-rolls and the tubular shafts, and means for forcing said forming-rolls toward a common center.

32. An apparatus for forming chain-links, comprising a stationary supporting-plate, on the face of which the link, when formed, is adapted to be supported, forming-rolls, shafts therefor, tubular shafts surrounding aforesaid shafts, gearing for rotating them, a ball-and-socket joint between the ends of the shafts of the forming-rolls and the tubular shafts, sleeves on the forming-roll shafts, rods and weighted lever connected to said sleeves.

33. In a chain-forming apparatus a cover part having forming-rolls and a feed-channel, an opening to receive a formed link, and means for lifting said cover from said link when formed, in combination with an anvil and means for forming and forging the link thereon, said anvil and cover being located in operation with their faces adjacent, said forming and forging means being so located as to act upon the upper surface of said link, as it rests upon the anvil.

34. In a chain-forming apparatus, a pivoted cover part having forming-rolls, a feed-channel on the cover part, a shaft, and operating-lever mounted on the cover part, a detaining-arm on the shaft, and a cranked connection between the operating-lever and shaft, in combination with a stationary supporting-plate on which the link is formed and having forming means coöperating with those on the cover part.

35. In a chain-forming apparatus, a stationary supporting-plate on the face of which the link, when formed, is adapted to be supported, a cover part comprising forming-rolls, shafts therefor passing through said part, pinions on said shaft, and internal gear meshing therewith and mounted on the cover part, and gearing for rotating said internal gear in combination with forming-rolls having their working faces substantially perpendicular to said plate and independent of the cover part.

36. Apparatus for forming chain-links, comprising an anvil, on the face of which the link, when formed, is adapted to be supported, rolls adjacent to its surface, said rolls adapted to give a link a rotary motion, and a hammer above said rolls adapted to be operated in combination with means for permitting an outward motion of the rotary rolls upon the operation of the hammer.

37. Apparatus for forming chain-links, comprising an anvil, on the face of which a link, when formed, is adapted to be supported, rolls adjacent to its surface and yieldingly held toward a common center, there being an unobstructed passage between them said rolls adapted to give the links a rotary motion, and a hammer above said rolls in combination with manually-operated means for moving outwardly the rotating rolls.

38. An apparatus for the mechanical manufacture of chains, comprising an anvil, on the face of which the ring, when formed, is adapted to be supported, a cap resting on the anvil and means for removing it, and forming means inclosed by said cap for the formation of the ring, forming means adjacent to the said anvil having their working surfaces substantially perpendicular to the surface of the anvil, and so located as to produce between themselves and the forming means of the cap a channel of the shape of the ring to be formed, a hammer for forging the ring, means adapted to permit the withdrawal of the forming means and cap away from the ring and out of the path of travel of the hammer.

39. Apparatus for the formation of chain-rings, comprising a stationary anvil, forming means adjacent to the face thereof, a cap above the anvil's face, and a conduit in said cap to permit of the feed of a bar, so located and so formed as to cause the bar to be fed to the forming-rolls on a line at an angle to said anvil, means for withdrawing the cap and its forming means from the ring when formed, and a hammer located above the forming means and operable toward and from the same and adapted to be operated after the removal of the cap.

40. An apparatus for the mechanical manufacture of chains, comprising a stationary anvil, on the face of which the ring, when formed, is adapted to be maintained while manipulating the link, a removable cap immediately above the anvil and inclosing the parts for the formation of the ring, a conduit in the cap for the introduction of the bar of metal in the forming apparatus, rolls projecting above the face of the anvil and having their working surfaces substantially perpendicular to the surface of the anvil, so located as to form a channel into which the conduit of the cap opens, a hammer above the mechanism described, means for withdrawing the cap from the anvil to expose the ring to the hammer, and means for yieldingly supporting the rolls whereby they may be moved from contact with the ring.

41. An apparatus for the mechanical manufacture of chains, comprising a stationary anvil, on the face of which the link, when formed, is supported and maintained, two groups of rolls for the formation of the ring, one group within the ring to be formed and mounted so as to be withdrawn when the ring is formed; another group exterior to the ring to be formed, and means whereby these latter may be moved outwardly as the ring increases in size during the operation, the said groups forming a passage between the rollers substantially perpendicular to the surface of the anvil.

42. An apparatus for the manufacture of chains, comprising an anvil, on the face of which the ring is formed and maintained while being worked, forming-rolls emerging from the anvil and movable outward from a common center, means for forcing them toward this common center and separating them away from it, a cap provided with forming appliances and movably mounted so that it can be withdrawn after the ring is formed, the said rollers and forming appliances forming a channel above the surface of the anvil, a retaining-arm in the cap, means to raise the cap and at the same time to lower said retaining-arm, and means to raise said arm while continuing the removal of the cap.

43. An apparatus for the mechanical manufacture of chains, comprising a stationary anvil, on the face of which the link is formed and held while being manipulated, rolls emerging from the face of the anvil, the said rolls being arranged about a common center to give to the inclosed ring to be worked a movement of rotation either continuous or discontinuous, and forming a conduit on the face of the anvil, a hammer mounted above the said rolls and adapted to enter between them to act upon the ring.

In testimony whereof I have signed my name to this specification in the presence of two subscribing witnesses.

EMILE LELONG.

Witnesses:
 CH. BASTIAN,
 GUST. PIERRY.